(12) United States Patent
Kopikare et al.

(10) Patent No.: US 8,233,456 B1
(45) Date of Patent: Jul. 31, 2012

(54) POWER SAVE MECHANISMS FOR DYNAMIC AD-HOC NETWORKS

(75) Inventors: Rahul Kopikare, Livermore, CA (US);
Milind Kopikare, San Jose, CA (US);
Kapil Chhabra, Sunnyvale, CA (US)

(73) Assignee: Marvell International Ltd. (BM)

( * ) Notice: Subject to any disclaimer, the term of this patent is extended or adjusted under 35 U.S.C. 154(b) by 756 days.

(21) Appl. No.: 11/867,665

(22) Filed: Oct. 4, 2007

Related U.S. Application Data

(60) Provisional application No. 60/829,594, filed on Oct. 16, 2006.

(51) Int. Cl.
*H04J 3/14* (2006.01)
*H04L 12/26* (2006.01)

(52) U.S. Cl. ....................................... 370/332
(58) Field of Classification Search .................. None
See application file for complete search history.

(56) References Cited

U.S. PATENT DOCUMENTS

| | | | |
|---|---|---|---|
| 4,959,847 A | 9/1990 | Engelke et al. | |
| 5,488,693 A | 1/1996 | Houck et al. | |
| 5,738,583 A | 4/1998 | Comas et al. | |
| 5,850,592 A | 12/1998 | Ramanathan | |
| 5,877,701 A | 3/1999 | Nagakura | |
| 6,453,181 B1 | 9/2002 | Challa et al. | |
| 6,524,189 B1 | 2/2003 | Rautila | |
| 6,975,613 B1 | 12/2005 | Johansson | |
| 6,980,522 B2 | 12/2005 | Boyle | |
| 7,095,732 B1 * | 8/2006 | Watson, Jr. | 370/346 |
| 7,110,366 B2 | 9/2006 | Hulyalkar et al. | |
| 7,120,456 B1 | 10/2006 | Elliot et al. | |
| 7,158,798 B2 | 1/2007 | Lee et al. | |
| 7,257,721 B2 | 8/2007 | Chung et al. | |
| 7,496,065 B2 | 2/2009 | Anjum et al. | |
| 7,505,795 B1 * | 3/2009 | Lim et al. | 455/574 |
| 7,515,897 B2 | 4/2009 | Suzuki | |
| 7,899,017 B2 | 3/2011 | Yu et al. | |
| 7,978,647 B2 | 7/2011 | Anjum et al. | |
| 2001/0055950 A1 | 12/2001 | Davies et al. | |
| 2002/0013784 A1 | 1/2002 | Swanson | |
| 2002/0061743 A1 | 5/2002 | Hutcheson et al. | |
| 2002/0091790 A1 | 7/2002 | Cubley | |
| 2002/0103019 A1 | 8/2002 | Emmerson | |
| 2002/0107985 A1 | 8/2002 | Hwang et al. | |

(Continued)

FOREIGN PATENT DOCUMENTS

CN 1375772 A 10/2002

(Continued)

OTHER PUBLICATIONS

Lortz et al., "*Wi-Fi Simple Config Specification*", Wi-Fi Alliance Confidential, Version 1.0a, Feb. 10, 2006, pp. 1-107.

(Continued)

*Primary Examiner* — Raj Jain

(57) ABSTRACT

Techniques for establishing a dynamic ad-hoc wireless network are disclosed. A node transitions between wake and sleep modes during periods defined as beacon intervals. Before a network connection is established and while it is awake, the node transmits network connection request and also listens for network activity. If a beacon or response message is not detected while the node is listening, the node enters sleep mode and thereby conserves power. The node optionally changes the duration of its detection period and/or the time at which it listens for network activity relative to the start of each beacon interval. Information elements are optionally included with transmitted beacons or response messages.

26 Claims, 10 Drawing Sheets

U.S. PATENT DOCUMENTS

| | | | |
|---|---|---|---|
| 2002/0147044 | A1 | 10/2002 | Jakobsson et al. |
| 2002/0159401 | A1 | 10/2002 | Boger |
| 2002/0176366 | A1 | 11/2002 | Ayyagari et al. |
| 2003/0023761 | A1 | 1/2003 | Jeansonne et al. |
| 2003/0041150 | A1 | 2/2003 | Passman et al. |
| 2003/0078062 | A1 | 4/2003 | Burr |
| 2003/0084337 | A1 | 5/2003 | Simionescu et al. |
| 2003/0099212 | A1 | 5/2003 | Anjum et al. |
| 2003/0163579 | A1 | 8/2003 | Knauerhase et al. |
| 2004/0081110 | A1 | 4/2004 | Koskimies |
| 2004/0127289 | A1 | 7/2004 | Davis et al. |
| 2004/0139159 | A1 | 7/2004 | Ricciardi et al. |
| 2004/0146022 | A1* | 7/2004 | Lewis et al. .................. 370/331 |
| 2004/0259542 | A1 | 12/2004 | Vitamaki et al. |
| 2005/0122940 | A1 | 6/2005 | Nian |
| 2005/0129055 | A1* | 6/2005 | Hall et al. .................... 370/461 |
| 2005/0138462 | A1 | 6/2005 | Hunt et al. |
| 2005/0268151 | A1 | 12/2005 | Hunt et al. |
| 2005/0286464 | A1 | 12/2005 | Saadawi et al. |
| 2005/0286480 | A1 | 12/2005 | Akiyama |
| 2006/0013160 | A1 | 1/2006 | Haartsen |
| 2006/0135261 | A1 | 6/2006 | Kinne et al. |
| 2006/0154710 | A1 | 7/2006 | Serafat |
| 2006/0179322 | A1 | 8/2006 | Bennett et al. |
| 2006/0221915 | A1 | 10/2006 | Gatta et al. |
| 2006/0246947 | A1 | 11/2006 | Fujii et al. |
| 2006/0251004 | A1 | 11/2006 | Zhong et al. |
| 2006/0259632 | A1 | 11/2006 | Crawford et al. |
| 2006/0282541 | A1 | 12/2006 | Hiroki |
| 2007/0030824 | A1 | 2/2007 | Ribaudo et al. |
| 2007/0105548 | A1 | 5/2007 | Mohan et al. |
| 2007/0141988 | A1 | 6/2007 | Kuehnel et al. |
| 2007/0155505 | A1 | 7/2007 | Huomo |
| 2007/0190494 | A1 | 8/2007 | Rosenberg |
| 2007/0202890 | A1 | 8/2007 | Feher |
| 2007/0265018 | A1 | 11/2007 | Feher |
| 2008/0013487 | A1 | 1/2008 | Molteni et al. |
| 2008/0019522 | A1 | 1/2008 | Proctor |
| 2008/0037444 | A1 | 2/2008 | Chhabra |
| 2008/0037495 | A1 | 2/2008 | Anjum et al. |
| 2008/0043868 | A1 | 2/2008 | Feher |
| 2008/0108437 | A1 | 5/2008 | Kaarela et al. |
| 2008/0146337 | A1 | 6/2008 | Halonen et al. |
| 2008/0164984 | A1 | 7/2008 | Sheffer |
| 2008/0167865 | A1 | 7/2008 | Yamanashi et al. |
| 2008/0172491 | A1 | 7/2008 | Chhabra et al. |
| 2008/0220878 | A1 | 9/2008 | Michaelis |
| 2009/0011834 | A1 | 1/2009 | Chhabra |
| 2009/0180441 | A1 | 7/2009 | Ikeda |
| 2009/0210531 | A1 | 8/2009 | Melnikov |
| 2009/0279506 | A1 | 11/2009 | Sinnreich et al. |

FOREIGN PATENT DOCUMENTS

| | | |
|---|---|---|
| CN | 1522503 A | 8/2004 |
| CN | 1842000 A | 10/2006 |
| EP | 1 622 319 A2 | 2/2006 |
| JP | 2004-135778 | 0/0520 |
| JP | 2004-136009 | 10/2002 |
| JP | 2004-141225 | 10/2002 |
| JP | 2003-289277 | 10/2003 |
| JP | 2006-086959 | 9/2004 |
| JP | 2006-050020 | 2/2006 |
| JP | 2006-148448 | 6/2006 |
| WO | WO 03/003610 A1 | 6/2002 |
| WO | WO 2005/076543 | 8/2005 |

OTHER PUBLICATIONS

International Search Report for PCT Application No. PCT/US07/17529, mailed Oct. 1, 2008.
Written Opinion of the International Searching Authority for PCT Application No. PCT/US07/17529, mailed Oct. 1, 2008.
Chinese Office Action dated Jul. 8, 2010 for Application No. 200780037626.8.
U.S. Appl. No. 60/862,898, filed Oct. 25, 2006, Kopikare.
U.S. Appl. No. 11/924,431, filed Oct. 25, 2007, Kopikare.
IEEE, "Further Higher-Speed Physical Layer Extension in the 2.4 GHz Band", IEEE, Draft Std 802.11 q-2002, New York, NY, May 2002, Downloaded from the Internet (47 pages).
IEEE, "Part 11: Wireless LAN Medium Access Control (MAC) and Physical Layer (PHY) specifications, Amendment 2: Higher-speed Physical Layer (PHY) extension in the 2.4 GHz band", IEEE Std 802.11 b-1999/Cor 1-2001, New York, NY, Nov. 7, 2001, Downloaded from the Internet (23 pages).
IEEE, "Part 11: Wireless LAN Medium Access Control (MAC) and Physical Layer (PHY) specifications, Amendment 5: Spectrum and Transmit Power Management Extensions in the 5 GHz band in Europe", IEEE Std 802.11 h-2003, New York, NY, Oct. 14, 2003, Downloaded from the Internet (75 pages).
IEEE, "Part 11: Wireless LAN Medium Access Control (MAC) and Physical Layer (PHY) specifications, Amendment 6: Medium Access Control (MAC) Security Enhancements", IEEE Std 802.11 i-2004, New York, NY, Jul. 23, 2004, Downloaded from the Internet (190 pages).
IEEE, "Part 11: Wireless LAN Medium Access Control (MAC) and Physical Layer (PHY) specifications, Amendment 7: Medium Access Control (MAC) Quality of Service (QoS) Enhancements", IEEE P802.11 e/D11.0, New York, NY, Oct. 2004, Downloaded from the Internet (195 pages).
IEEE, "Part 11: Wireless LAN Medium Access Control (MAC) and Physical Layer (PHY) specifications: Further Higher Data Rate Extension in the 2.4 GHz Band", IEEE P802.11 g/D8.2, New York, NY, Apr. 2003, Downloaded from the Internet (69 pages).
IEEE, "Part 11: Wireless LAN Medium Access Control (MAC) and Physical Layer (PHY) specifications: High-speed Physical Layer in the 5 GHZ Band", IEEE Std 802.11 a-1999, New York, NY, Dec. 30, 1999, Downloaded from the Internet (91 pages).
IEEE, "Part 11: Wireless LAN Medium Access Control (MAC) and Physical Layer (PHY) specifications: Higher-Speed Physical Layer Extension in the 2.4 GHz Band", IEEE Std 802.11 b-1999, New York, NY, Jan. 20, 2000, Downloaded from the Internet (96 pages).
IEEE, "TGn Sync Proposal Technical Specification-Abstract," IEEE 802.11-04/0889r6, Mujtaba, Syed Aon, Agere Systems, Allentown, PA, May 18, 2005, Downloaded from the Internet (131 pages).
IEEE P802. 11g/D8.2, Draft Supplement to Standard [for] Information Technology, Telecommunication and information exchange between systems, Local and metropolitan area networks-Specific requirements, Part 11: Wireless LAN Medium Access Control (MAC) and Physical Layer (PHY) specifications: Further Higher Data Rate Extension in the 2.4 Ghz Band, 69 pgs, Apr. 2003.
IEEE Std. 802.11 a-1999, Supplemental to IEEE Standard for Information technology, Telecommunications and information exchange between systems, Local and metropolitan area networks, Part 11: Wireless LAN Medium Access Control (MAC) and Physical Layer (PHY) specifications: High-speed Physical Layer in the 5 GHZ Band, 91 pages., Sep. 16, 1999.
IEEE Std. 802.11b-1999, Supplement to IEEE Standard for information technology, Telecommunication and information exchange between systems, Part 11: Wireless LAN Medium Access Control (MAC) and Physical Layer (PHY) specifications: Higher-Speed Physical Layer Extension in the 2.4 GHz Band, 96 pgs., Sep. 16, 1999.
Office Action issued in U.S. Appl. No. 11/800,166 mailed Jun. 25, 2009.
Office Action issued in U.S. Appl. No. 11/800,166 mailed Feb. 24, 2010.
Office Action issued in U.S. Appl. No. 11/800,166 mailed Aug. 19, 2010.
Office Action issued in U.S. Appl. No. 11/800,166 mailed Mar. 29, 2011.
Office Action issued in U.S. Appl. No. 11/867,661, mailed Sep. 15, 2009.
Office Action issued in U.S. Appl. No. 11/867,661, mailed Mar. 26, 2010.
Office Action issued in U.S. Appl. No. 11/867,661, mailed Jun. 11, 2010.
Office Action issued in U.S. Appl. No. 11/867,661 mailed Nov. 1, 2010.
Office Action issued in U.S. Appl. No. 11/800,166, mailed Jun. 25, 2009.

Office Action issued in U.S. Appl. No. 11/800,166, mailed Feb. 24, 2010.
Office Action issued in U.S. Appl. No. 11/800,166, mailed Aug. 19, 2010.
Office Action issued in U.S. Appl. No. 11/800,166, mailed Mar. 29, 2011.
Office Action issued in U.S. Appl. No. 11/924,431, mailed Apr. 12, 2011.
Chinese Office Action issued in Chinese Application No. 200780038678.7, dated Sep. 13, 2010.
Notification Concerning Transmittal of Copy of International Preliminary Report on Patentability for corresponding PCT Application No. PCT/US2007/080733 mailed Apr. 30, 2009.
International Search Report for corresponding PCT Application No. PCT/US2007/080733 mailed Sep. 9, 2008.
Written Opinion for corresponding PCT Application No. PCT/US2007/08733 mailed Sep. 9, 2008.
Chinese Office Action issued in Chinese Application No. 200780038678.7, dated Oct. 18, 2011.
Hirano Aya, "Introductory Techniques for Current Wireless LAN," Nikkei network vol. 67, Japan Nikkei BP, Nikkei Business Publications, Inc., 2005, (see also English translation of Summary of Japanese Office Action dated Nov. 29, 2011).
Japanese Office Action dated Nov. 29, 2011 for Japanese Patent Application No. 2009-523819, including English translation of Summary of Japanese Office Action.
Japanese Office Action dated Feb. 7, 2012 for Japanese Patent Application No. 2009-532521, including English translation of Summary of Japanese Office Action.

* cited by examiner

POWER SAVE MECHANISMS FOR DYNAMIC AD-HOC NETWORKS

CROSS-REFERENCES TO RELATED APPLICATIONS

The present application claims benefit under 35 USC §119(e) of U.S. Provisional Application No. 60/829,594, filed on Oct. 16, 2006, entitled "Power Save Mechanisms for Dynamic Ad-Hoc networks," the content of which is incorporated herein by reference in its entirety.

The present application is related to U.S. application Ser. No. 11/867,661, filed Oct. 4, 2007, entitled "Automatic Ad-Hoc Network Creation And Coalescing Using WPS", the content of which is incorporated herein by reference in its entirety.

BACKGROUND OF THE INVENTION

The present invention relates to wireless communication networks, and more particularly to a protocol for establishing a dynamic ad-hoc wireless network connection.

Wireless fidelity (Wi-Fi) networks are being increasingly used to exchange data. One known Wi-Fi standard, commonly referred to as Wi-Fi Protected Setup (WPS) or Wi-Fi Simple Configuration (WSC), is a Wireless Local Area Network (WLAN) standard that defines the communication modes and the associated configuration protocols for an infrastructure WLAN.

There are three logical components in an infrastructure WSC network, namely a registrar, an access point (AP), and an enrollee. Referring to FIG. 1A, to establish a wireless communications link with legacy AP 10, WSC client 12 first seeks to acquire network credentials from external registrar 14 using an 802.11 network. Subsequently, WSC client 12 establishes a link to legacy AP 10 using the network credentials that WSC client 12 has acquired from external registrar 14.

Referring to FIG. 1B, AP 20 is shown as having an embedded registrar. To establish a communications link with AP 20, WSC client 22 first seeks to acquire network credentials from AP 20's embedded registrar over an 802.11 infrastructure network. Subsequently, using the acquired network credentials, WSC client 22 wirelessly connects to AP 20.

Referring to FIG. 1C, to establish a communications link with WSC AP 30, WSC client 32 first seeks to acquire network credentials using an extended authentication protocol (EAP) via WSC AP 30. WSC AP 30 relays the WSC client 32's EAP message to registrar 34 using a Universal Plug and Play (UpnP) protocol. Next, using the acquired network credentials supplied by registrar 34, WSC client 32 establishes a communications link with WSC AP 30. WSC and its communication protocols are described, for example, in Wi-Fi Simple Configuration Specification, Version 1.0a, Feb. 10, 2006, by Wi-Fi Simple Configuration Working Group in the Wi-Fi Alliance.

These WSC configurations do not contain provisions for establishing and maintaining dynamic ad-hoc wireless local area networks, but instead focus on the infrastructure mode of WLAN operation. In addition, each assumes that a registrar is always available to service requests while a network is being configured and therefore they do not include a power-saving feature whereby network nodes can minimize power consumption before establishing a network connection. Given the transient nature of ad-hoc wireless networks, many wireless devices spend a substantial amount of time without a network connection. Thus, it would be desirable to enable such devices to conserve power while waiting to establish a network connection. Further, it would also be desirable to maintain a high degree of networking availability while power is being conserved.

BRIEF SUMMARY OF THE INVENTION

In accordance with one embodiment of the present invention, a method of establishing a wireless ad-hoc network connection includes, in part, defining a beacon interval at a first node that has first and second subintervals and sending a network connection request during a first portion of the first subinterval. The method also includes detecting a network connection request from a second node during a second portion of the first subinterval. If a network connection request is not detected, the first node enters a sleep mode during the second subinterval. In an exemplary embodiment, the sleep mode represents more than 90% of the beacon interval. In some embodiments, while in sleep mode, the first node does not detect or send network connection requests.

The method may also include defining a monitoring period having an integral number of beacon intervals and extending the duration of the first subinterval to one full beacon interval after each monitoring period. The second subinterval is canceled during a beacon interval when the first subinterval is extended. In some embodiments, a network connection is established with the second node upon detecting a network connection request from the second node and data is exchanged between nodes using the network connection. The sleep mode may be suspended when a network connection request from the second node is detected.

In additional embodiments, the method includes transmitting an acknowledgement message that is responsive to the network connection request from the second node and waiting for a reply to the acknowledgement message. If the reply is not received within a predetermined amount of time, the network connection may be terminated. In further embodiments, an acknowledgment message from the second node that is responsive to the network connection request of the first node is detected and a network connection is established with the second node.

In accordance with another embodiment of the present invention, a method of establishing a wireless ad-hoc network connection includes, in part, defining a beacon interval having a plurality of subintervals and defining a monitoring period comprising an integral number of beacon intervals. The method further includes sending a network connection request from a first node during a first subinterval and detecting a network connection request from a second node during a second subinterval. Also, the method includes entering a sleep mode of the first node absent detecting the network connection request from the second node. After each monitoring period, a duration of the second subinterval is changed at the first node from a first value to a second value. The second value is determined in relation to the second node to provide for detecting a network connection request between the first and second nodes within a predetermined number of beacon intervals. In an exemplary embodiment, the second value has a duration of approximately ½ of the beacon interval.

In accordance with a further embodiment of the present invention, a method of establishing a wireless ad-hoc network connection includes, in part, defining a beacon interval having a plurality of subintervals with each subinterval corresponding to a different position within the beacon interval. The method also includes sending a network connection request from a first node during a predetermined one of the plurality of subintervals and detecting a network connection request from a second node during one or more of said plurality of subintervals. The first node enters a sleep mode except when detecting or sending a network connection request. Also, the subinterval for detecting the network connection request from the second node rotates within the plurality of subintervals in a round-robin fashion following each beacon interval.

In some embodiments, if a network connection request from the second node is detected, the method further includes identifying an information element (IE) corresponding to the second node in the network connection request from the second node and adding the information element to network connection requests sent from the first node. The first node continues to detect messages from the second node for a predetermined number of subintervals or until a network connection is established. In some embodiments, if the first node detects a network connection request from the second node that includes its own information element, it continues to detect messages from the second node for a predetermined number of subintervals or until a network connection is established. The information elements may represent a network address (such as a MAC address) and may include security credentials used to determine whether a connection should be established.

In accordance with another embodiment of the present invention, a first device adapted to participate in a wireless ad-hoc network is disclosed. The first device includes a controller configured to define a beacon interval of the first device having first and second subintervals. The first device also includes a transmitter configured to send a network connection request during a first portion of the first subinterval and a receiver configured to detect a network connection request from a second device during a second portion of the first subinterval. The controller causes the first device to enter a sleep mode during the second subinterval absent detecting the network connection request from the second device.

In accordance with one embodiment of the present invention, a device adapted to establish a wireless ad-hoc network connection is disclosed. A first device includes, in part, a controller configured to define a beacon interval having first and second subintervals and to define a monitoring period spanning an integral number of beacon intervals. The first device also includes a transmitter configured to send a network connection request during a first portion of the first subinterval and a receiver configured to detect a network connection request from a second device during a second portion of the first subinterval. The controller causes the first device to enter a sleep mode during the second subinterval absent detecting the network connection request from the second device. After each monitoring period, the controller changes a duration of the second subinterval from a first value to a second value. The second value is determined in relation to the second device to provide detection of a network connection requests between the first and second devices within a predetermined number of beacon intervals.

In accordance with a further embodiment of the present invention, a device adapted to establish a wireless ad-hoc network connection is disclosed. A first device includes a controller configured to define a beacon interval having a plurality of subintervals such that each subinterval corresponds to a position within the beacon interval. The first device also includes a transmitter configured to send a network connection request during a predetermined one of the plurality of subintervals and a receiver configured to detect a network connection request from a second device during one of the plurality of subintervals. The controller causes the first device to enter a sleep mode except when detecting or sending a network connection request. Also, the subinterval for detecting a network connection request from the second node rotates within the plurality of subintervals in a round-robin fashion following each beacon interval.

A device in accordance with one embodiment of the present invention includes, in part, means for defining a beacon interval that has first and second subintervals and means for sending a network connection request during a first portion of the first subinterval. The device also includes means for detecting a network connection request from a second node during a second portion of the first subinterval. If a network connection request is not detected, the device employs means for entering a sleep mode during the second subinterval. In an exemplary embodiment, the sleep mode represents more than 90% of the beacon interval. In some embodiments, while in sleep mode, the device does not detect or send network connection requests.

The device may also include means for defining a monitoring period having an integral number of beacon intervals and means for extending the duration of the first subinterval to one full beacon interval after each monitoring period. The device may further include means for canceling the second subinterval during a beacon interval when the first subinterval is extended. In some embodiments, means for establishing a network connection with the second node upon detecting a network connection request from the second node are included as well as means for exchanging data with the second node using the network connection. The device may also include means for suspending the sleep mode when a network connection request from the second node is detected.

In additional embodiments, the device may include means for transmitting an acknowledgement message that is responsive to the network connection request from the second node and means for waiting for a reply to the acknowledgement message. The device may further include means for terminating the network connection if the reply is not received within a predetermined amount of time.

In accordance with another embodiment of the present invention, a device for establishing a wireless ad-hoc network connection includes, in part, means for defining a beacon interval having a plurality of subintervals and means for defining a monitoring period comprising an integral number of beacon intervals. The device further includes means for sending a network connection request during a first subinterval and means for detecting a network connection request from a second node during a second subinterval. Also, the device includes means for entering a sleep mode absent detecting the network connection request from the second node. The device includes means for changing a duration of the second subinterval from a first value to a second value.

In accordance with a further embodiment of the present invention, a device for establishing a wireless ad-hoc network connection includes, in part, means for defining a beacon interval having a plurality of subintervals with each subinterval corresponding to a different position within the beacon interval. The device also includes means for sending a network connection request during a predetermined one of the plurality of subintervals and means for detecting a network connection request from a second node during one or more of said plurality of subintervals. The device includes means for entering a sleep mode when not detecting or sending a network connection request. Also, the device includes means for rotating the subinterval for detecting the network connection request from the second node within the plurality of subintervals in a round-robin fashion following each beacon interval.

In some embodiments, if a network connection request from the second node is detected, the device further includes means for identifying an information element (IE) corresponding to the second node in the network connection request from the second node and means for adding the information element to network connection requests sent from the device. The device includes means for detecting messages from the second node for a predetermined number of subintervals or until a network connection is established. In some embodiments, if the device detects a network connection request from the second node that includes the information element of the device, it continues to detect messages from the second node for a predetermined number of subintervals or until a network connection is established. The information elements may represent a network address (such as a MAC address) and may include security credentials used to determine whether a connection should be established.

In accordance with an embodiment of the present invention, a computer-readable medium encoded with one or more sequences of one or more instructions for establishing a wireless ad-hoc network is disclosed. The computer-readable medium includes instructions which, when executed by one or more processors, cause the one or more processors to perform steps of defining a beacon interval at a first node that has first and second subintervals and sending a network connection request during a first portion of the first subinterval. The medium also includes instructions for detecting a network connection request from a second node during a second portion of the first subinterval. The medium includes instructions for causing the first node to enter a sleep mode during the second subinterval if a network connection request from the second node is not detected. In an exemplary embodiment, the sleep mode represents more than 90% of the beacon interval. In some embodiments, the medium includes instructions such that, while in sleep mode, the first node does not detect or send network connection requests.

The computer-readable medium may also include instructions for defining a monitoring period having an integral number of beacon intervals and extending the duration of the first subinterval to one full beacon interval after each monitoring period. The medium may include instructions for canceling the second subinterval during a beacon interval when the first subinterval is extended. In some embodiments, the medium includes instructions for establishing a network connection with the second node upon detecting a network connection request from the second node and exchanging data between nodes using the network connection. The medium may include instructions for suspending the sleep mode of the first node when a network connection request from the second node is detected.

In additional embodiments, the computer-readable medium includes instructions for transmitting an acknowledgement message that is responsive to the network connection request from the second node and waiting for a reply to the acknowledgement message. The medium may also include instructions for terminating the network connection if the reply is not received within a predetermined amount of time. In further embodiments, the medium includes instructions for detecting an acknowledgment message from the second node that is responsive to the network connection request of the first node and establishing a network connection with the second node.

In accordance with another embodiment of the present invention, a computer-readable medium encoded with one or more sequences of one or more instructions for establishing a wireless ad-hoc network is disclosed. The computer-readable medium includes instructions which, when executed by one or more processors, cause the one or more processors to perform steps of defining a beacon interval having a plurality of subintervals and defining a monitoring period comprising an integral number of beacon intervals. The medium further includes instructions for sending a network connection request during a first subinterval and detecting a network connection request from a second node during a second subinterval. Also, the medium includes instructions for entering a sleep mode absent detecting the network connection request from the second node. The medium also includes instructions for changing a duration of the second subinterval from a first value to a second value after each monitoring period.

In accordance with a further embodiment of the present invention, a computer-readable medium encoded with one or more sequences of one or more instructions for establishing a wireless ad-hoc network is disclosed. The computer-readable medium includes instructions which, when executed by one or more processors, cause the one or more processors to perform steps of defining a beacon interval having a plurality of subintervals and defining a monitoring period comprising an integral number of beacon intervals. The medium further includes instructions for sending a network connection request from a first node during a first subinterval and detecting a network connection request from a second node during a second subinterval. Also, the medium includes instructions for entering a sleep mode of the first node absent detecting the network connection request from the second node. The medium includes instructions for changing a duration of the second subinterval at the first node from a first value to a second value after each monitoring period. The second value is determined in relation to the second node to provide for detecting a network connection request between the first and second nodes within a predetermined number of beacon intervals. In an exemplary embodiment, the second value has a duration of approximately ½ of the beacon interval.

In accordance with a further embodiment of the present invention, a computer-readable medium encoded with one or more sequences of one or more instructions for establishing a wireless ad-hoc network is disclosed. The computer-readable medium includes instructions which, when executed by one or more processors, cause the one or more processors to perform steps of defining a beacon interval having a plurality of subintervals with each subinterval corresponding to a different position within the beacon interval. The medium also includes instructions for sending a network connection request from a first node during a predetermined one of the plurality of subintervals and detecting a network connection request from a second node during one or more of said plurality of subintervals. The medium includes instructions for causing the first node to enter a sleep mode except when detecting or sending a network connection request. Also, the medium includes instructions for rotating the subinterval for detecting the network connection request from the second node within the plurality of subintervals in a round-robin fashion following each beacon interval.

In some embodiments, the computer-readable medium includes instructions for identifying an information element (IE) corresponding to the second node in the network connection request from the second node and adding the information element to network connection requests sent from the first node if a network connection request from the second node is detected. The medium also includes instructions for causing the first node to continue detecting messages from the second node for a predetermined number of subintervals or until a network connection is established. In some embodiments, the medium includes instructions such that if the first node detects a network connection request from the second node that includes its own information element, the first node continues to detect messages from the second node for a predetermined number of subintervals or until a network connection is established. The information elements may represent a network address (such as a MAC address) and may include security credentials used to determine whether a connection should be established.

DETAILED DESCRIPTION OF THE INVENTION

Techniques for establishing a dynamic ad-hoc wireless network are disclosed. A node transitions between wake and sleep modes during periods defined as beacon intervals. Before a network connection is established and while it is awake, the node transmits network connection request and also listens for network activity. If a beacon or response message is not detected while the node is listening, the node enters sleep mode and thereby conserves power. The node optionally changes the duration of its detection period and/or the position relative to the start of each beacon interval at which it listens for network activity. Information elements are optionally included with the transmitted beacons or response messages.

Figure 1A:
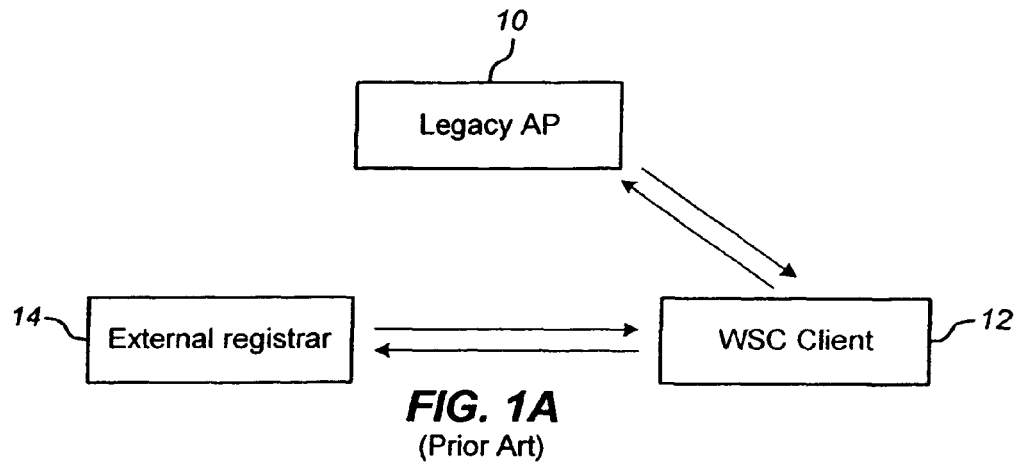
FIGS. 1A-1C show various logical components of an infrastructure mode wireless local area network as known in the prior art.
Figure 1B:
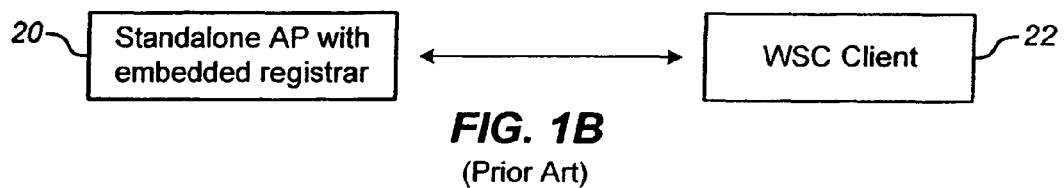
Figure 1C:
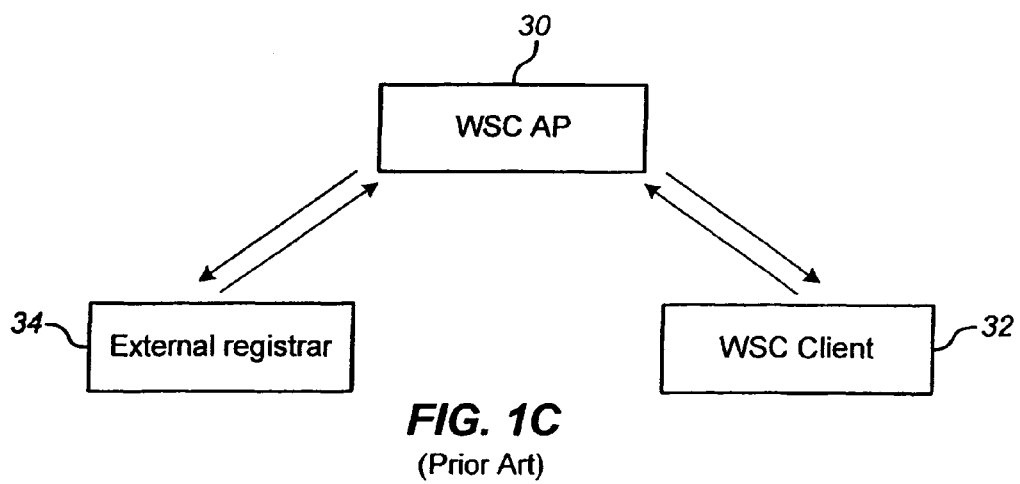
Figure 2A:
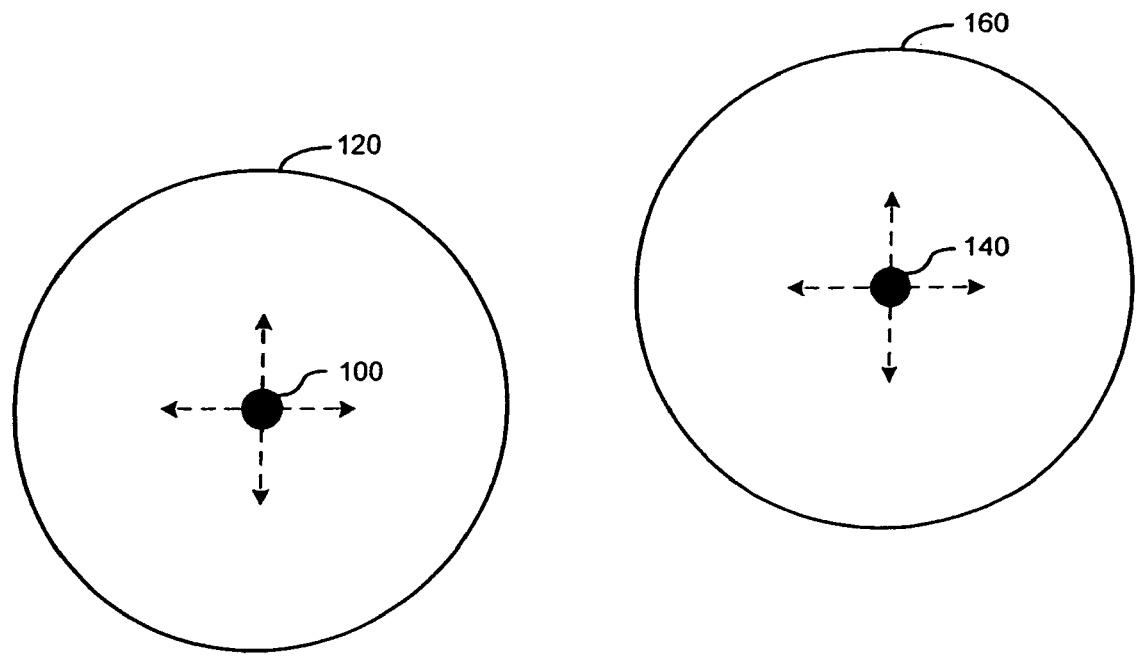
FIGS. 2A and 2B illustrate nodes establishing a network connection in a dynamic, ad-hoc wireless network according to embodiments of the present invention.

FIG. 2A illustrates nodes configured to participate in dynamic, ad-hoc wireless networks according to an embodiment of the present invention. Nodes 100, 140 move arbitrarily with respect to each other. As shown, nodes 100, 140 are physically separated and neither has established a network connection. In this state, each node 100, 140 attempts to locate one or more other nodes within its respective communication range 120, 160. An access point or other fixed networking infrastructure is not required. In some embodiments nodes 100, 140 automatically initiate the process of establishing a wireless ad-hoc network connection.

Nodes 100, 140 establish a network connection by periodically transmitting a network connection request. The network connection request is hereinafter alternatively described as a beacon or probe without loss of generality. Thus, for example, a node operating in registrar mode may transmit a beacon announcing its availability and, in some cases, indicating its networking capabilities. Similarly, a node operating in enrollee mode may transmit a probe-request seeking to locate a registrar and to establish a network connection. In some embodiments, each node 100, 140 is capable of functioning either as a registrar or an enrollee and their respective roles are determined as part of the connection process. Also, in some embodiments, a node functioning as an enrollee may synchronize its internal clocks and timers to a signal generated by the node functioning as the registrar during the connection process.

Network connection requests are typically transmitted as broadcast messages and may include an information element (IE) specific to the transmitting node. In some embodiments, the information element may include an OSI (open systems interconnection) Layer 2 address of the node such as its MAC (media access control) address. Different or additional information elements such as PIN codes and security credentials may also be included as part of the network connection request.

In some embodiments, nodes 100, 140 are battery powered devices for which conserving power is an important consideration. Specifically, conserving power before a network connection has been established may be particularly important as nodes 100, 140 can spend a substantial amount of time in a transient, disconnected state. For example, in a remote entry system for an automobile, node 100 may represent a battery-powered controller and node 140 may represent a base unit mounted in the automobile. A driver may carry the controller in his or her pocket and it may be outside of the communication range of the base unit for a considerable amount of time. In this situation, it is desirable to conserve battery power so that, upon returning to the automobile, the controller can establish a connection with the base unit and unlock the doors or perform other useful functions. Conventional power-saving protocols do not address this dynamic, ad-hoc wireless networking situation where nodes may roam about seeking to establish a network connection.

Nodes 100, 140 share responsibility for generating beacons and thereby establishing a network connection. In some embodiments, before a network connection is established, each node 100, 140 is awake while transmitting its beacon and for a period of time while it listens for network activity. At all other times, nodes 100, 140 enter a sleep mode to save power. While in the sleep mode, nodes 100, 140 do not transmit or receive network messages. By alternating between wake and sleep modes, power consumption is reduced. However, unlike conventional systems, a registrar node according to the present invention is not available to accept a network connection if it is in a sleep mode.

In some embodiments, nodes 100, 140 transition between wake and sleep modes at regular intervals. A beacon interval (BI) may be defined as a basic unit of time during which a node 100, 140 is operational. Beacon intervals may be further divided into (1) an active subinterval during which a node is either transmitting a network connection request or listening for network activity and (2) a sleep subinterval during which a node is conserving power by not transmitting or receiving network messages.

Figure 2B:
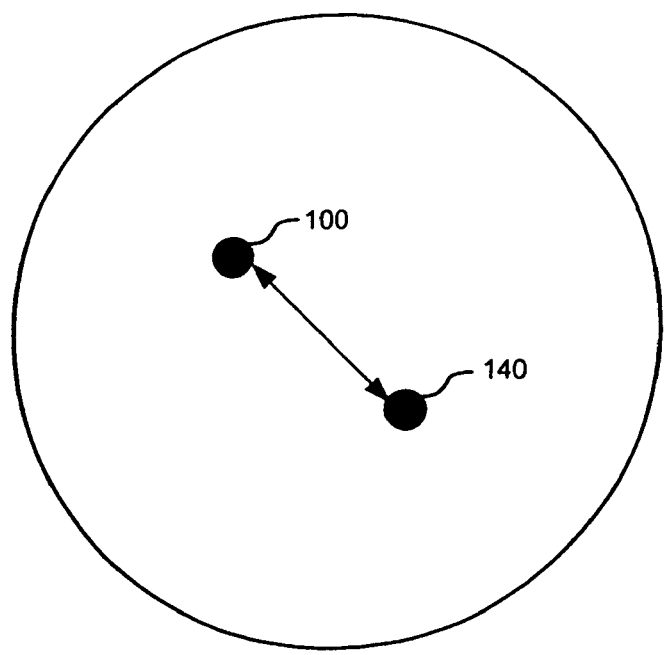

Referring to FIG. 2B, nodes 100, 140 have changed locations and are shown as being within communication range of each other. The process of establishing a network connection begins when one node detects the other node's beacon. For example, while in active mode, node 100 may detect a beacon or probe-request generated by node 140. At that time, node 100 may suspend its sleep mode and remain active while a network connection to node 140 is established and data is transferred. Thereafter, the nodes may separate and each may resume alternating between wake and sleep modes until another network connection is detected.

In this dynamic ad-hoc context, the maximum time required for nodes to detect a network connection request and to begin establishing a network connection can be measured in terms of beacon intervals. Thus, as will be described in further detail, embodiments of the present invention seek to minimize node power consumption before a network connection has been established while also limiting the amount of time required for nodes to locate each other and begin the process of establishing a network connection. In this regard, saving power and limiting connect times may be seen as competing considerations. Trade-offs between these considerations are reached according to the various embodiments of the present invention.

Figure 3:
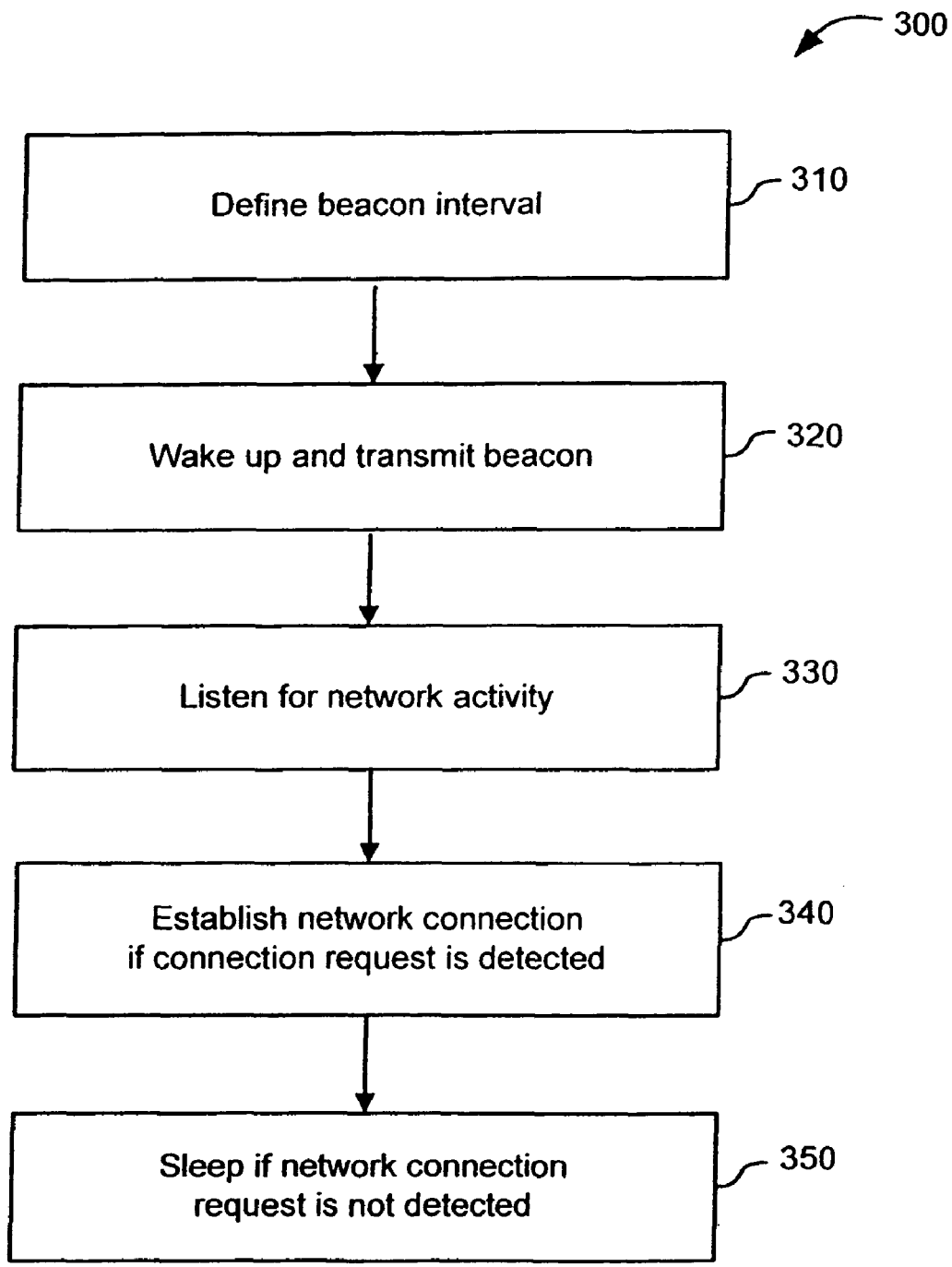
FIG. 3 is a flowchart showing operations performed by a node according to one embodiment of the present invention.

FIG. 3 is a flowchart 300 showing operations performed by a node according to one embodiment of the present invention. At step 310, a beacon interval is defined for the node as a basic unit of time measurement. As indicated, the beacon interval is divided into an active region and a sleep region. The active region may also be described as the "sniff subinterval" (or "sniff interval") and represents that portion of a beacon interval during which a node is transmitting a network connection request or listening for network activity. In some embodiments, each regularly occurring beacon interval may be divided into a plurality of subintervals of equal duration. The sniff subinterval may occur regularly within the beacon interval and may span one or more of the subintervals. An exemplary beacon interval has a duration of approximately 100 ms. However, it will be appreciated that the BI is fully configurable according to networking requirements and application-specific criteria.

At step 320, the node wakes up during its sniff subinterval and transmits a beacon. As previously noted, the beacon represents a network connection request and may be generated by a node acting as a network registrar. Alternatively, the beacon may be generated by an enrollee node seeking to locate a registrar. In the later case, the beacon may be described as probe-request. The node also listens for network activity during the sniff interval as indicated at step 330. Although shown in sequence, listening for network activity may optionally precede transmitting the beacon. In one embodiment, the duration of the sniff period is approximately 3.2 ms.

While listening for network activity, the node may detect a network connection request transmitted by another node. The network connection request may represent a beacon generated by the other node or it may represent a response to the transmitted beacon. For example, the other node may have detected a beacon transmitted at step 320 during a preceding beacon interval and may have responded. The response may then be detected during the current beacon interval. If either type of network connection request is detected, the node responds by establishing a network connection 340 with the requesting node. Alternatively, if a network connection request is not detected, at step 350, the node enters a sleep mode. In an exemplary embodiment, the node may operate in the sleep mode for more than 90% of each beacon interval.

Figure 4:
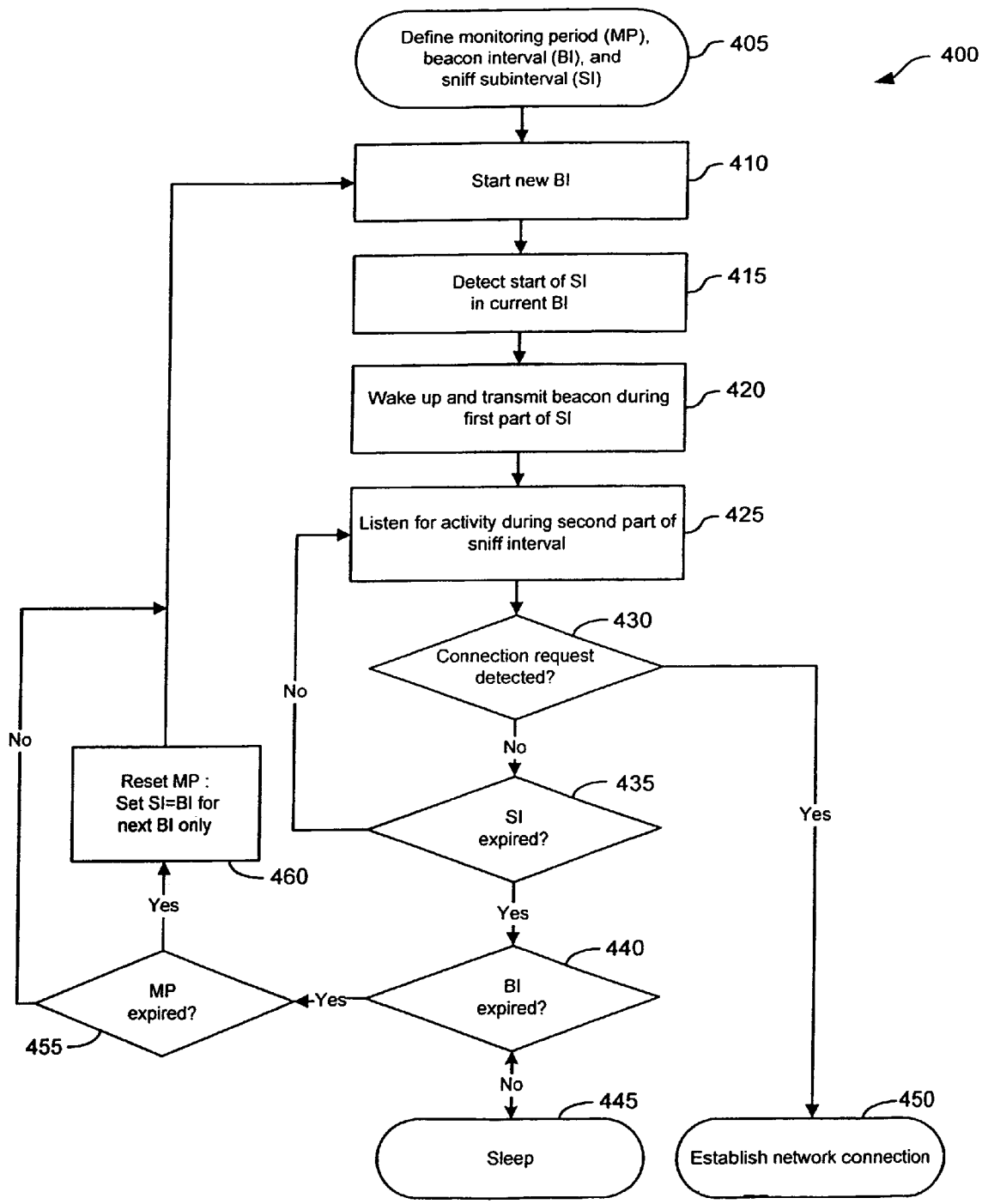
FIG. 4 is a flowchart showing operations performed by a node according to a further embodiment of the present invention.

FIG. 4 is a flowchart 400 showing operations performed by a node according to another embodiment of the present invention. In this embodiment, a duration of the sniff subinterval is extended to one full beacon interval at predetermined times. This feature guarantees that node detection will occur within a finite number of beacon intervals even if the transmit and detection intervals of two nodes are skewed in time with respect to each other.

At step 405, a monitoring period, beacon interval, and sniff subinterval are defined for the node. The beacon interval and sniff subinterval are as previously described. The monitoring period represents a predetermined amount of time and may, in some embodiments, be set equal to an integral number of beacon intervals. For example, each node may include a timer to measure its corresponding beacon interval and a counter that is incremented as the beacon interval timer expires. When the counter reaches a predetermined value, the end of a monitoring period is indicated. As persons of skill in the art will recognize, control logic for the monitoring period, beacon interval, and sniff interval may be implemented by various combinations of hardware, software, and firmware.

A new beacon interval begins at step 410. In some cases, the sniff interval may coincide with the beginning of the new beacon interval. For example, the sniff interval may be aligned to each beacon interval such that a node transmits its network connection request at the start of the current beacon period. In other cases, the sniff interval may be offset into the beacon period by a particular amount and the node may sleep during the start of each beacon period until the start of the sniff interval is detected. This activity is shown in step 415.

At step 420, the node wakes up and transmits its beacon during a first part of the sniff interval. Thereafter, at step 425, it listens for network activity during a second part of the sniff interval. If a network connection request is detected during the listening period 430, the node commences to negotiate a network connection with the requesting node 450. It will be appreciated that the network connection request may also be rejected based upon access criteria and security measures in place at the detecting node. For example, although not shown, the detecting node may accept the network connection request if it contains a predetermined information element and may reject the network connection request if the information element is not present. In some configurations, a node may reject a network connection request by simply ignoring it and not sending an acknowledgement message. In other configurations, the node may reject the connection request by sending a denial message to the requesting node.

If a connection request was not detected at step 430, the node determines whether the sniff interval has expired 435. If the sniff interval has not expired, the node continues to listen for network activity. On the other hand, if the sniff interval has expired, at step 440 the node determines whether the current beacon interval has also expired. For the remaining portion of the beacon interval, the node sleeps 445 and continues to check whether the current beacon interval has ended. For example, the node may monitor a timer value and, upon expiration of the timer, determine that the beacon interval has elapsed.

When the end of the current beacon interval is detected, at step 455, the node determines whether the monitoring period has also expired. By way of illustration, if a monitoring period is defined to include four beacon intervals, the node may increment a counter at the expiration of each and then check whether the value of the counter is four. If so, then the monitoring period has expired. Otherwise, the monitoring period has not expired and, at step 410, a new beacon interval commences.

If, at step 455, it is determined that the monitoring period has expired, the duration of the sniff subinterval is extended to one full beacon interval effective during the next beacon interval. In other words, following each monitoring period, the node remains awake for one full beacon interval and then resumes a normal wake-sleep cycle. In some embodiments, an additional time ($\Delta t$) is added to the extended sniff interval based upon the time required to establish a network connection. Additional time $\Delta t$ addresses boundary cases and ensures full coverage of the beacon interval. Thus, by periodically extending the sniff interval, a network connection request between nodes is guaranteed to be detected within a fixed number of beacon intervals. In the example given, a network connection request between two nodes will be detected within four beacon intervals.

Figure 5:
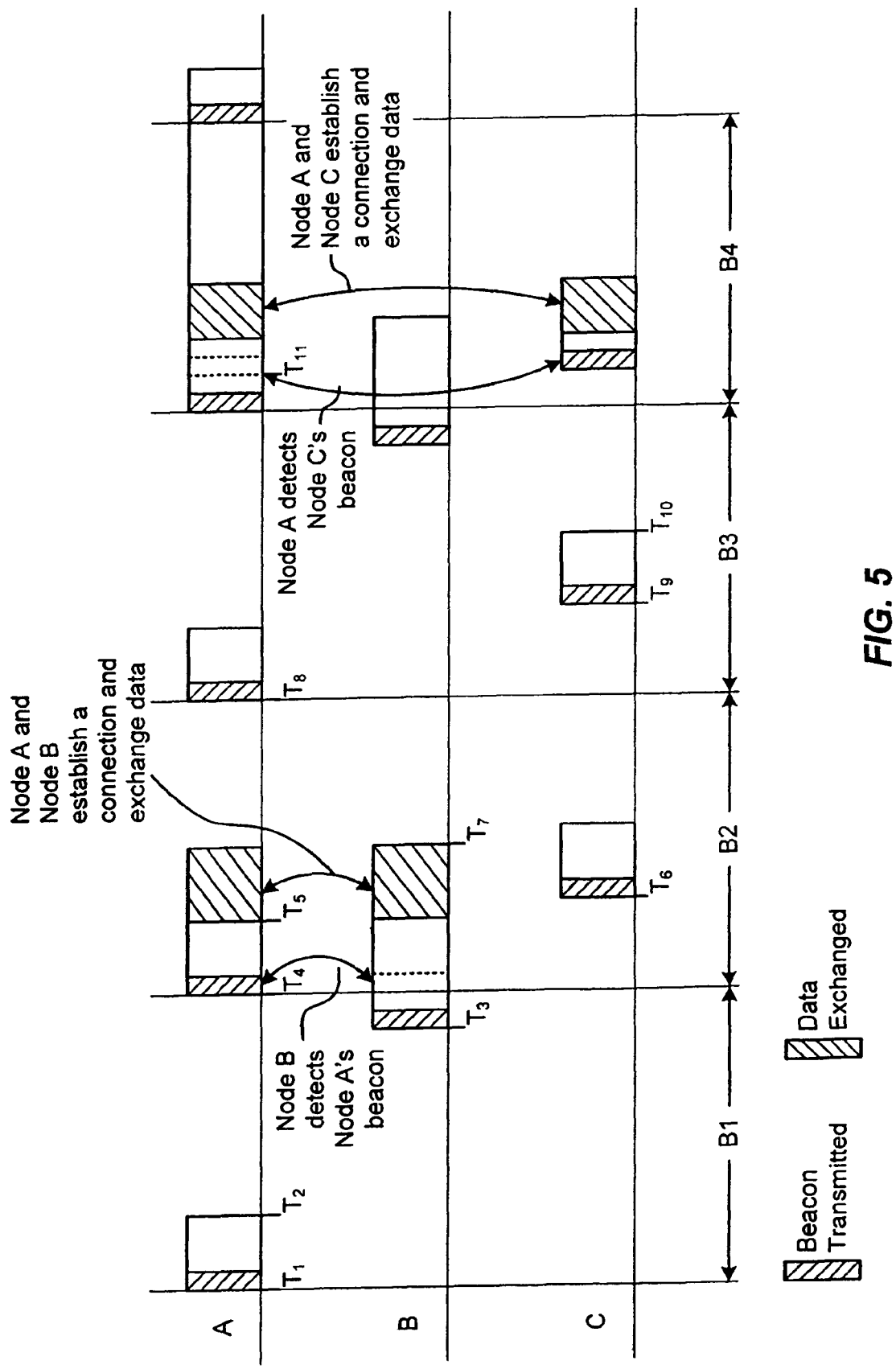
FIG. 5 is a diagram illustrating a process of establishing a dynamic ad-hoc network connection according to one embodiment of the present invention.

FIG. 5 is a diagram illustrating a process of establishing a network connection according to the embodiment of FIG. 3. As illustrated, nodes B and C communicate with node A at different times during beacon intervals B1-B4. For clarity, the exchanges are viewed from the standpoint of node A only. Accordingly, the beacon interval, sniff subinterval, and monitoring period described are relative to node A. Also, it is assumed that node B and node C only connect with node A and that they do not cross-connect with each other. However, it will be appreciated that these assumptions are made for clarity of presentation and are not required. It will also be appreciated that that the process of establishing a network connection may similarly be viewed from the standpoint of node B or node C.

At the start of beacon interval B1, node A transmits a network connection request at time $T_1$ and then listens for network activity until time $T_2$. Node A is assumed not to detect network activity during sniff subinterval ($T_1$, $T_2$). For example, there may not be other nodes in proximity to node A capable of participating in a dynamic, ad-hoc wireless network. At time $T_3$, toward the end of beacon interval B1, node B transmits its beacon. However, at time $T_3$, node A has entered sleep mode and does not detect node B's beacon.

At time $T_4$, node A wakes up and transmits its beacon to start beacon interval B2. Time $T_4$ falls within node B's sniff interval. Thus, node B detects node A's beacon. Starting at time $T_5$, node A and node B establish an ad-hoc network connection and exchange data using the network connection. When the data exchange has been completed, the network connection is terminated. At time $T_7$, both node A and node B enter a sleep mode.

While node A and node B are establishing a network connection and exchanging data, node C transmits its beacon at time $T_6$. Node C's beacon is not detected by node A and therefore a network connection is not established. At time $T_8$, node A transmits its beacon to start new beacon interval B3. However, at this time, node C has entered sleep mode and does not detect node A's beacon. Node C's subsequent sniff interval ($T_9$, $T_{10}$) occurs approximately in the middle of beacon interval B3 and is thus skewed in relation to the position of node A's sniff interval. This skew is sufficient to prevent node A and node C from establishing a network connection at their respective (non-extended) sniff intervals.

As beacon interval B4 begins, node A's monitoring period expires. As illustrated, the sniff interval of node A is then extended to cover the entire duration of B4 and an additional period $\Delta t$ to catch boundary cases. Thus, because its sniff period was extended, node A is awake at time $T_{11}$ and is able to detect node C's beacon. A network connection between node A and node C is then established and data is exchanged between the nodes. Node A continues to be awake into the next beacon interval as shown.

According to this embodiment, node A conserves power by sleeping for a substantial portion of beacon intervals B1-B3 and then remaining awake during beacon interval B4 to ensure detection of network connection requests even when the requests are skewed in time. In an exemplary embodiment, when not connected, each node may remain in sleep mode for 97% of the regular beacon intervals.

Figure 6:
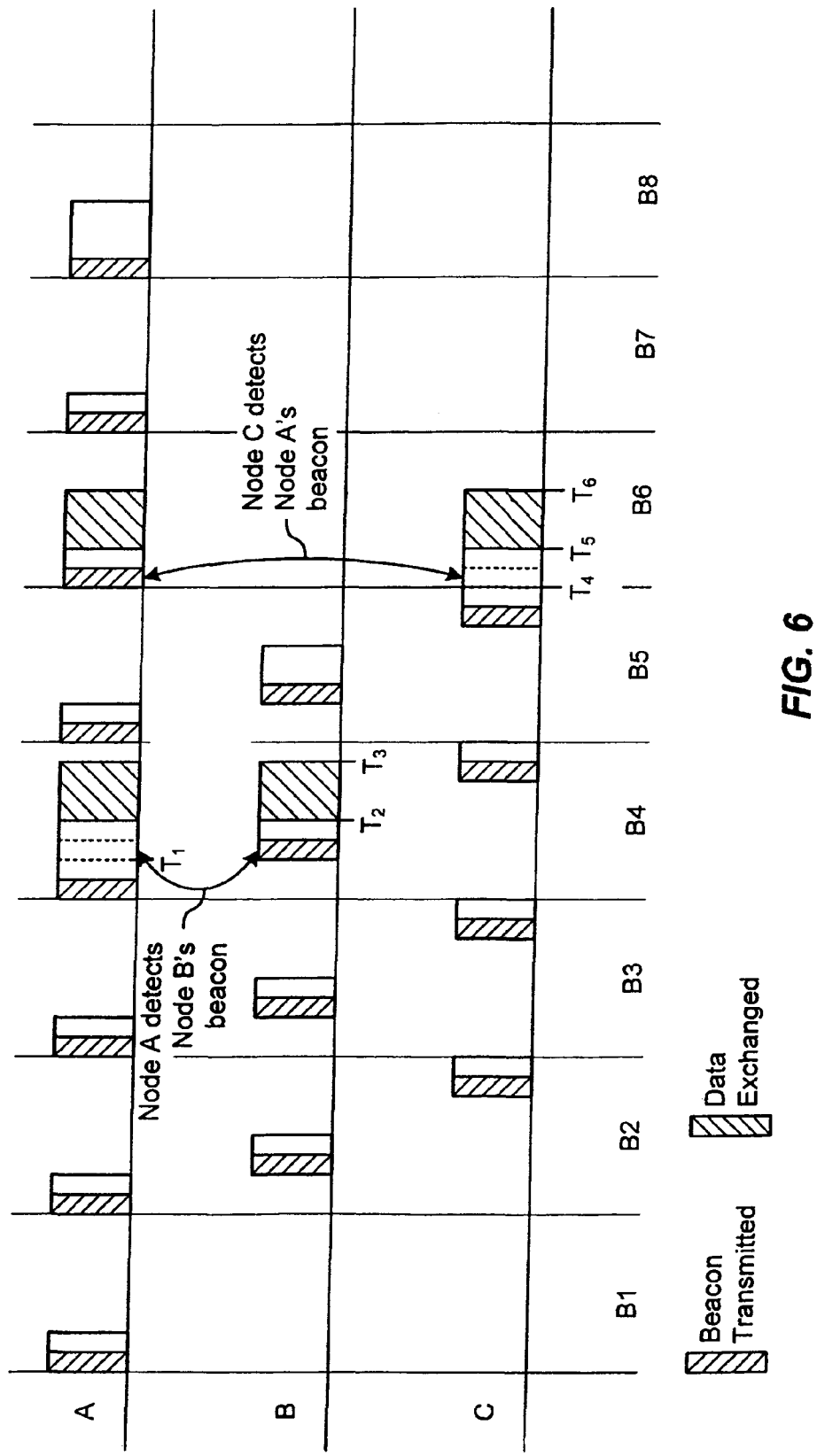
FIG. 6 is a diagram illustrating a process of establishing a dynamic ad-hoc network connection according to a further embodiment of the present invention.

FIG. 6 is a diagram illustrating a process of establishing a network connection according to another embodiment of the present invention. In this embodiment, upon expiration of the monitoring period, the sniff interval is extended to approximately ½ of the duration of the beacon interval plus an additional $\Delta t$ amount as previously discussed. Thus, power consumption is reduced compared to the preceding embodiment as the detecting time is shared between two nodes.

With reference to FIG. 6, the sniff subintervals of nodes A, B, and C are shown skewed in time. As a result, absent adjustment, these nodes are unable to automatically establish an ad-hoc network connection. However, according to the present embodiment, each node periodically extends its sniff subinterval in relation to its respective beacon interval. As a result, a network connection request exchanged between each node pair is detected within a finite number of beacon intervals. Connection setup time may be reduced by shortening the monitoring period. Both devices get an equal opportunity to transmit beacons due to the random backoff for broadcast packets which is a part of the 802.11 standard.

As illustrated, during beacon interval B1, node A transmits a network connection request, listens for network activity, and then sleeps. Node B and node C do not transmit during B1 and thus are not detected by node A. During beacon intervals B2 and B3, all three nodes transmit but no network connection is established due to the skew of their respective transmission and detection times.

At beacon interval B4, however, node A extends its sniff interval to cover ½ of the beacon interval and an additional amount related to the network connection time. As a result of extending its sniff interval, node A is awake at time $T_1$ and detects node B's beacon. Node A and node B are thus able to establish a network connection and exchange data using the network connection. The connection is then terminated at $T_3$ and node A resumes its regular sniff interval for beacon intervals B5-B7.

Similarly, at time $T_4$, node C's monitoring period expires and it extends the duration of its sniff interval. Node A has resumed its regular sniff intervals and transmits its beacon at time $T_4$ as beacon interval B6 begins. Because node C has extended its sniff interval, node C detects node A's beacon and the two nodes are able to establish a network connection. As shown, node A and node C establish a connection and exchange data during ($T_5$, $T_6$).

Figure 7:
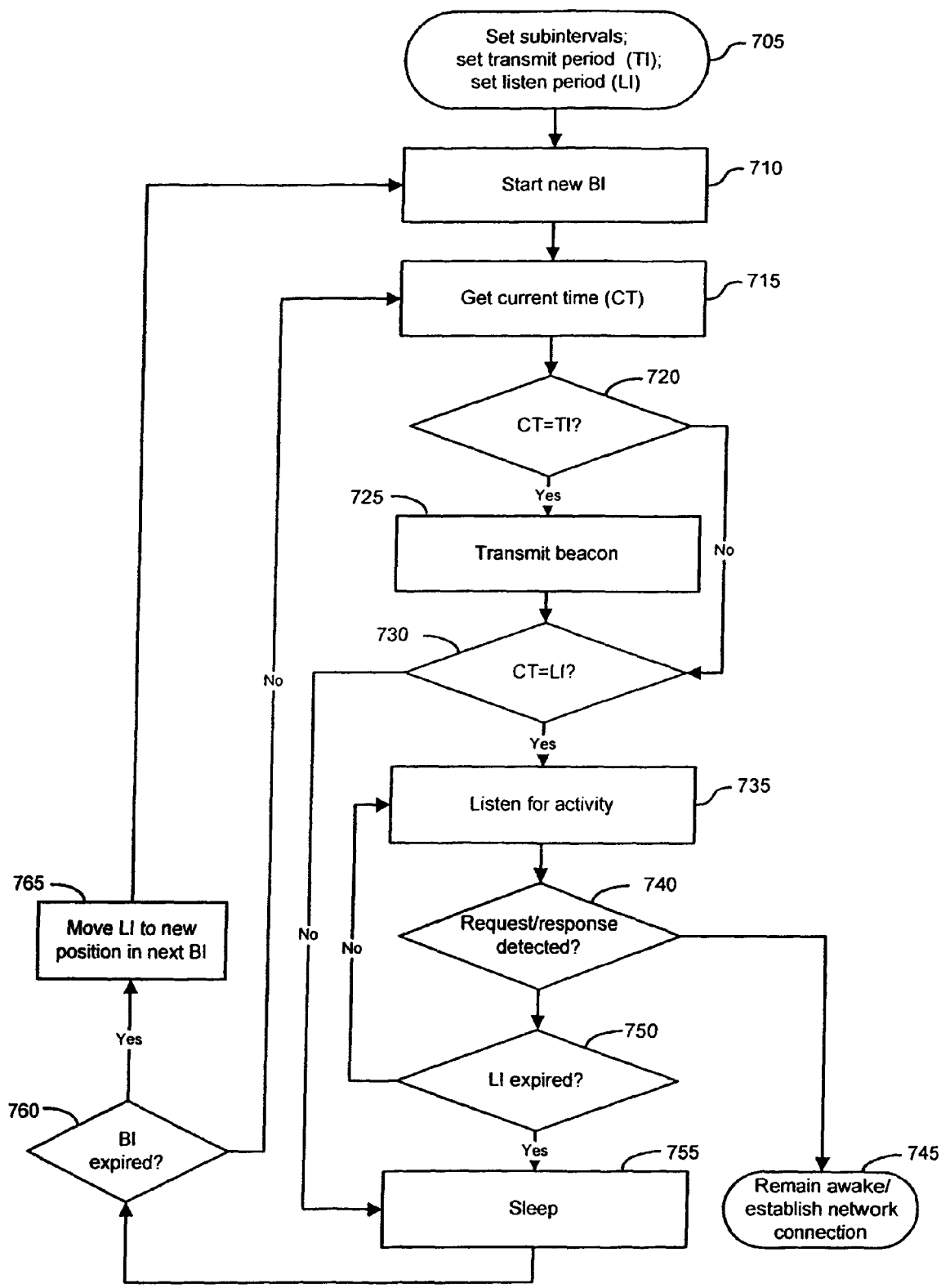
FIG. 7 is a flowchart showing operations performed by a node according to embodiments of the present invention.

FIG. 7 is a flowchart showing operations performed by a node according to one embodiment of the present invention. In this embodiment, the beacon interval is divided into a plurality of subintervals. During each beacon interval, a node transmits its beacon during a transmit period, detects network activity during a listening period, and sleeps if not transmitting or detecting. The listening period occupies one or more of the plurality of subintervals and may coincide with the transmit period. At the end of each beacon interval, the listening period shifts to a new position for the upcoming beacon interval and thereby occupies different ones of the subintervals during each new beacon interval. In effect, the listening period moves (or "hops") relative to the start of the beacon interval. Power consumption is thus further reduced while continuing to ensure that network connection requests are detected within a finite number of beacon intervals.

At step 705, a number of subintervals is defined for each beacon interval. The number of subintervals, for example, controls the granularity of the transmit and listening periods. The position of the transmit period (TI) within each beacon interval is also set along with an initial position of the listening period (LI). For example, each beacon interval may be divided into four subintervals (e.g., 0, 1, 2, 3). The first subinterval may be set as the transmit period (TI) and the second subinterval may be set as the initial value of the listening period (LI). When the transmit period and the listening period occupy the same subinterval, for example, a node may transmit during a first portion of the subinterval and then listen during the remaining portion of the subinterval in a manner similar to the sniff interval described in the preceding embodiments.

A beacon interval begins at step 710 and a time measurement is taken 715. For example, a timer or counter may be reset at the beginning of each beacon interval. Then, from time to time during the beacon interval, the value of the timer/counter (CT) may be read and used to identify the current subinterval and to control events. At step 720, the node detects whether it is time to transmit. If it is time to transmit then, at step 725, the node transmits its beacon; otherwise, processing continues at step 730.

At step 730, the node determines whether it is time to listen for network activity with reference to the current time value. The network activity may include, for example, a beacon from a second node requesting a network connection or a response to a previously transmitted beacon. If it is not time to listen for network activity then, at step 755, the node enters sleep mode. Otherwise, processing continues at step 740.

If a network connection request/response is detected then, at step 745, the node remains awake and proceeds to establish a network connection. In some embodiments, when a beacon is detected, the node modifies its beacon to include an information element (IE) from the detected beacon and transmits the modified beacon for a predetermined time or until a network connection is established. The node may remain awake to facilitate a network connection. The modified beacon signals to the detected node that its beacon was received. The modified beacon may also signal to the detected node that is should remain awake and proceed to establish the network connection. Similarly, the node may detect its own information element in a beacon thereby confirming that another node wishes to establish a connection. In such case, at step 745, the node remains awake while the connection is established. Through this exchange mechanism, two nodes operate to suspend their respective sleep modes while a connection is established.

If a network connection request/response was not detected, then at step 750 the node determines whether the listening period has expired. For example, the listening period may include one or more subintervals of the beacon interval. At step 750, the node may read the value of a timer and/or perform a comparison with a counter value to determine whether the listening period is complete. If the listening period is complete, the node enters sleep mode; otherwise, the node continues to listen for network activity.

While in sleep mode, the node periodically checks whether the current beacon interval has expired. This is shown at step 760. If the beacon interval has not expired, processing continues at step 715 and the node again checks whether it is time to listen or transmit. If, however, the current beacon interval has expired, then at step 765 the node changes the listening period to a new location for the next beacon interval. In some embodiments, for example, the listening period rotates in a round-robin fashion through the subintervals so that all subintervals are covered within a predetermined number of beacon intervals. Thus, the listening period moves at each new beacon interval.

Figure 8:
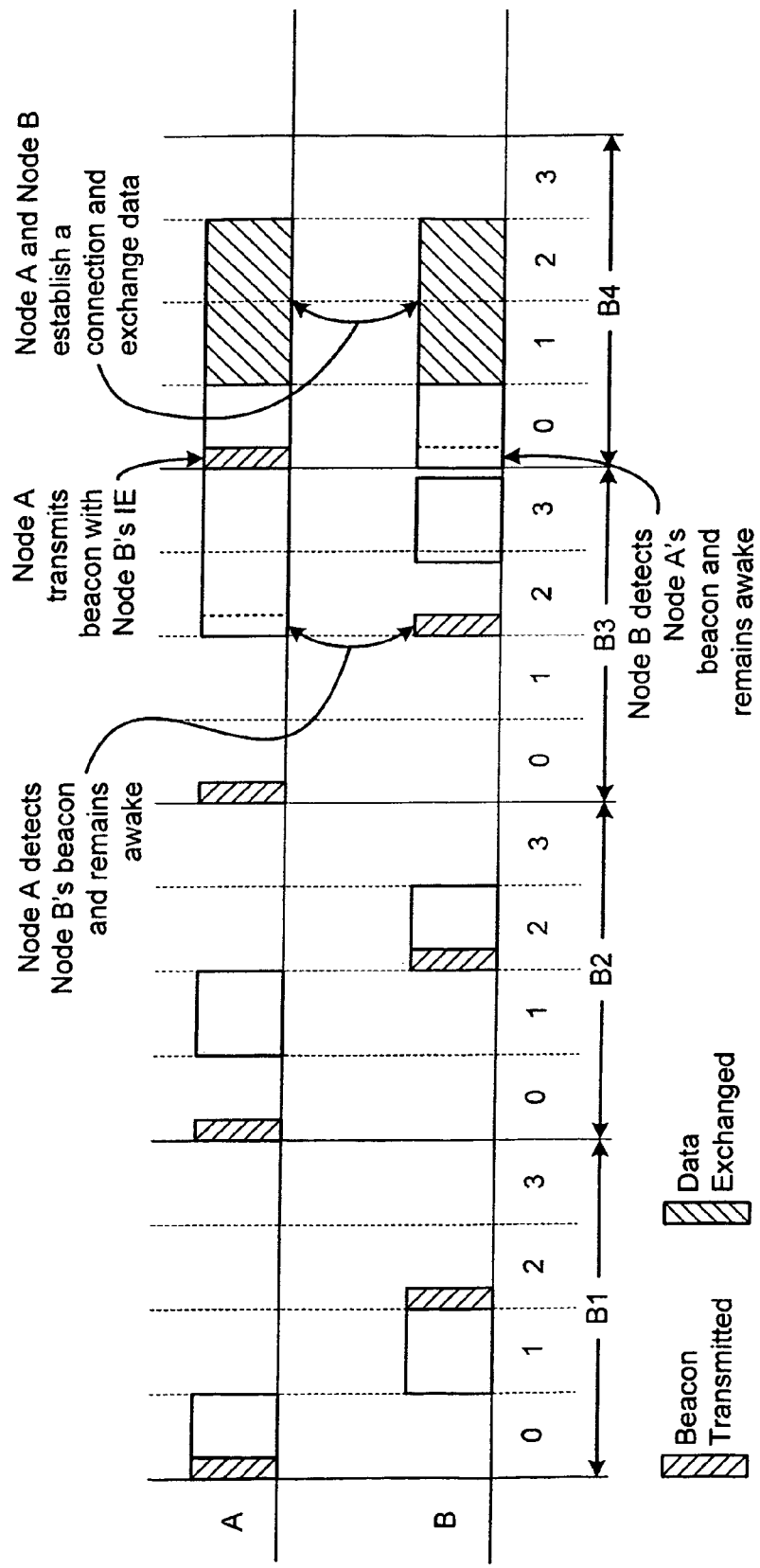
FIG. 8 is a diagram illustrating a process of establishing a dynamic ad-hoc network connection according to an embodiment of the present invention.

FIG. 8 is a diagram illustrating a process of establishing a network connection according to an embodiment of the present invention. Two nodes are shown interacting over a period of four beacon intervals (B1-B4). Each beacon interval comprises four subintervals. In B1, node A transmits and listens during subinterval 0 and node B listens during subinterval 1 and transmits during subinterval 2. Neither node detects the other node's beacon and therefore a connection is not established. At beacon interval B2, node A again transmits its beacon during subinterval 0 but changes its listening period to subinterval 1. Node B changes its listening period to subinterval 2 so that, in B2, it both transmits and listens during subinterval 2. Once again, neither node detects the other node's beacon and therefore a connection is not established.

At beacon interval B3, node A again transmits its beacon during subinterval 0 and again changes its listening period so that node A is listening during subinterval 2. Node B continues to transmit its beacon at subinterval 2 and changes its listening period to subinterval 3. Because node A is listening, it detects node B's beacon during subinterval 2 and recognizes node B's information element. Node A transmits a modified beacon during subinterval 0 of B4 including node B's information element to signify that it has heard node B's beacon and remains awake to while network connection is established. Node B detects node A's modified beacon during subinterval 0 of B4 and proceeds to establish the connection.

Figure 9:
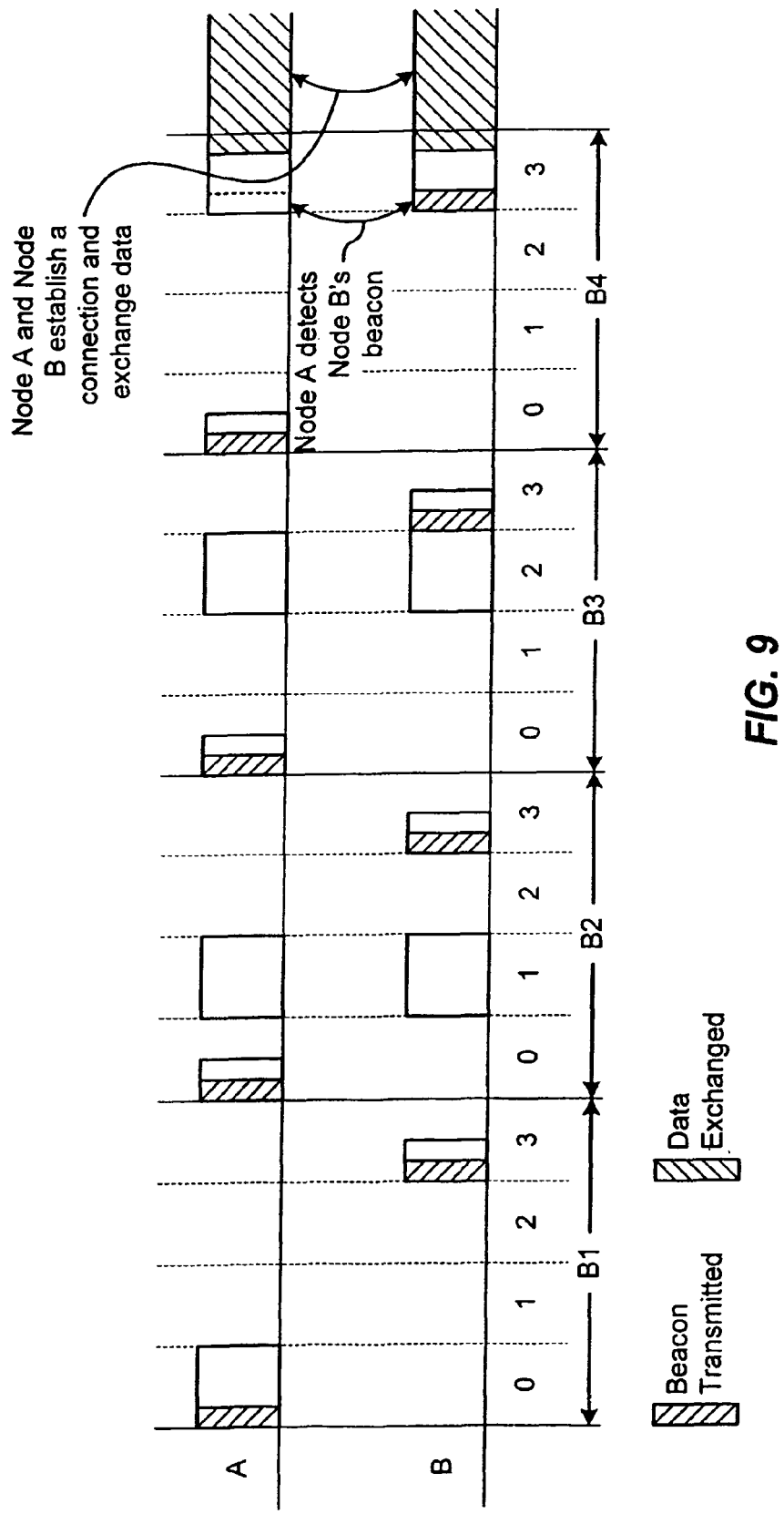
FIG. 9 is a diagram illustrating a process of establishing a dynamic ad-hoc network connection according to a further embodiment of the present invention.

FIG. 9 is a diagram illustrating a process of establishing a network connection according to a further embodiment of the present invention. This embodiment combines the sniff interval and variable listening period features of the preceding embodiments. As shown, a node transmits its beacon and listens for a period of time. The node also detects network activity during a listening period that moves with respect to the start of the beacon interval. This embodiment may consume more power than the embodiments of FIGS. 7-8 but may also reduce connection setup times and potentially reduce design complexity.

In FIG. 9. during beacon intervals B1-B3, node A and node B fail to establish a network connection as neither node detects the other's beacon. However, at B4, node A changes its listening period to subinterval 3 and thus detects node B's beacon. Thereafter, the nodes proceed in normal fashion to establish a connection and exchange data using the connection. In some embodiments, information elements are included in the beacons as previously discussed.

Figure 10:
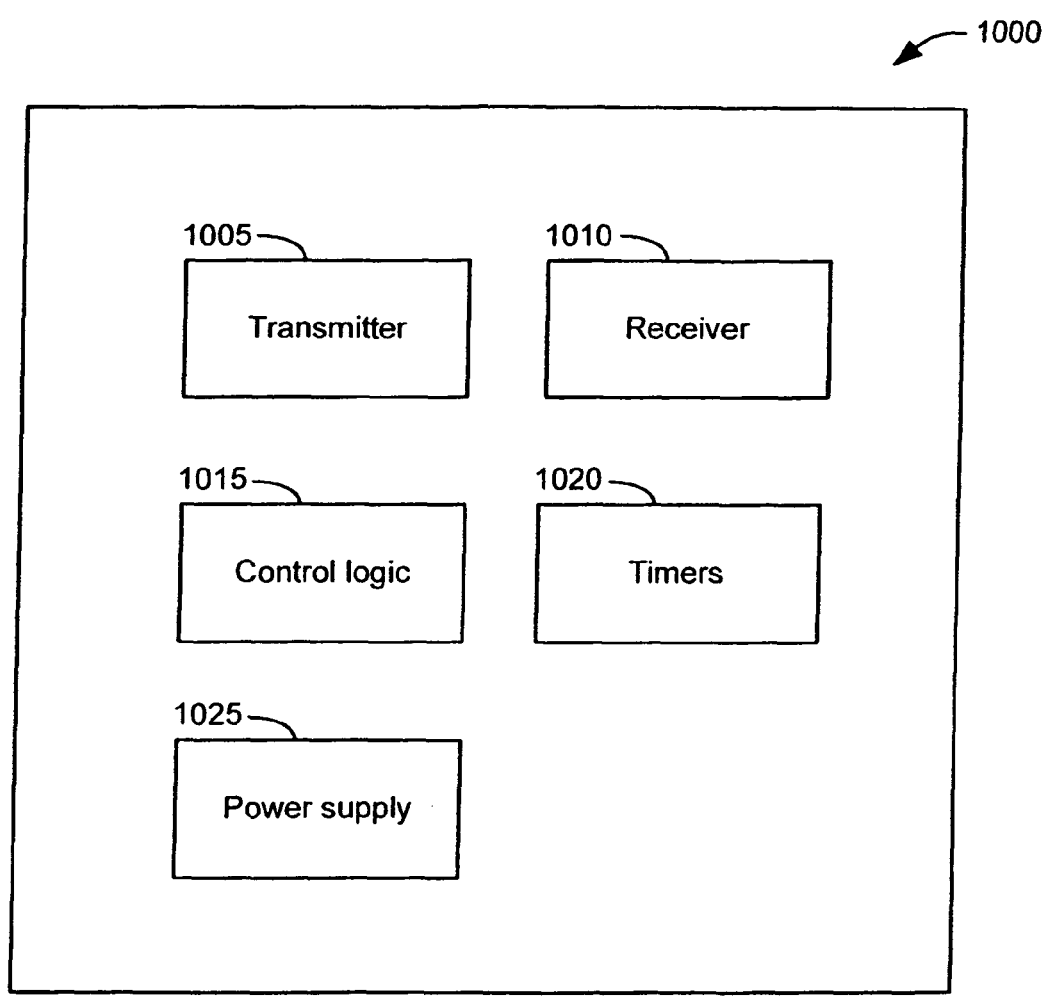
FIG. 10 is a hardware block diagram of a network device according to embodiments of the present invention

FIG. 10 shows a hardware block diagram of a network device 1000 according to embodiments of the present invention. Device 1000 is shown as including, in part, a transmitter 1005, a receiver 1010, control logic 1015, one or more timers 1020, and a power supply 1025.

Transmitter 1005 is configured to transmit a network connection request and to transmit response messages while an ad-hoc network connection is being established or negotiated. Transmitter 1005 may also be used to exchange data using the network connection. Receiver 1010 detects wireless network activity and is configured for use in establishing an ad-hoc network connection. Receiver may also be configured to participate in data exchanges with other nodes. Transmitter 1005 and receiver 1010 are powered by power supply 1025 when active.

Control logic 1015 controls transmitter 1005 and receiver 1010. Timers 1020 measure various intervals of time during which device 1000 is operational. In some embodiments, control logic 1015 causes device 1000 to switch between active and sleep modes of operation with reference to one or more values of timers 1020. For example, control logic 1015 may define a beacon interval, sniff interval, and monitoring period as previously discussed. During active mode, control logic 1015 may cause power supply 1025 to energize receiver 1010 and transmitter 1005 so that network connection requests be detected and sent respectively. While node 1000 is in sleep mode, however, control logic 1015 may de-energize transmitter 1005 and receiver 1010 to conserve power. Control logic 1015 may include a number of modules or logic blocks configured to facilitate ad-hoc network connections and to conserve power. In various embodiments, power supply 1025 is a battery and control logic 1015 operates to extend battery life while preserve the availability of device 1000 to establish network connections.

The above embodiments of the present invention are illustrative and not limiting. Various alternatives and equivalents are possible. Other additions, subtractions or modifications are obvious in view of the present disclosure and are intended to fall within the scope of the appended claims.

What is claimed is:

1. A method of establishing a wireless ad-hoc network connection, the method comprising:
   defining a beacon interval at a first node, said beacon interval having a first subinterval and a second subinterval;
   sending a network connection request from said first node during a first portion of said first subinterval;
   detecting a network connection request from a second node during a second portion of said first subinterval; and
   entering a sleep mode during said second subinterval absent detecting said network connection request from said second node.

2. The method of claim 1 wherein during said sleep mode said first node does not detect or send network connection requests.

3. The method of claim 1 further comprising:
   defining a monitoring period spanning an integral number of beacon intervals; and
   extending a duration of said first subinterval to one beacon interval following each monitoring period thereby canceling the second subinterval during said one beacon interval following each monitoring period.

4. The method of claim 1 further comprising:
   establishing a network connection with said second node upon detecting said network connection request from said second node; and
   exchanging data with said second node using said network connection.

5. The method of claim 4 further comprising:
   transmitting an acknowledgement message responsive to said network connection request from said second node;
   waiting for a reply from said second node to said acknowledgement message; and
   terminating said network connection if said reply is not received within a predetermined amount of time.

6. The method of claim 4 further comprising:
   suspending said sleep mode for a duration of said network connection.

7. The method of claim 1 further comprising:
   detecting an acknowledgment message from said second node responsive to said network connection request of said first node; and
   establishing a network connection with said second node.

8. The method of claim 7, further comprising:
   sending a reply to said acknowledgement request enabling said network connection with said second node to be established.

9. The method of claim 1 wherein a duration of said second subinterval is at least 90% of the duration of said beacon interval.

10. The method of claim 1, further comprising:
    defining a monitoring period, said monitoring period including an integral number of beacon intervals;
    wherein, after each monitoring period, a duration of said second portion is changed at said first node from a first value to a second value, and
    wherein said second value is determined in relation to said second node to provide detection of a network connection request between said first node and said second node within a predetermined number of beacon intervals.

11. The method of claim 10, wherein said second value corresponds to a duration equal to approximately one-half of said beacon interval.

12. The method of claim 10, wherein said second value corresponds to a duration equal to one-half of said beacon interval and an additional period related to a time required to establish said wireless ad-hoc connection.

13. The method of claim 10, wherein, during said sleep mode, said first node does not detect or send network connection requests.

14. A device adapted to participate in a wireless ad-hoc network, the device comprising:
    a controller configured to define a beacon interval of the device, the beacon interval having a first subinterval and a second subinterval;
    a transmitter configured to send a network connection request during a first portion of said first subinterval;
    a receiver configured to detect a network connection request from a second device during a second portion of said first subinterval; and
    wherein said controller causes the device to enter a sleep mode during said second subinterval absent detecting said network connection request from said second device.

15. The device of claim 14 wherein during said sleep mode the device does not detect or send network connection requests.

16. The device of claim 14 wherein said controller is further configured to define a monitoring period spanning an integral number of beacon intervals, and to extend the duration of said first subinterval to one beacon interval following each monitoring period thereby canceling said second subinterval during said one beacon interval following each monitoring period.

17. The device of claim 14 wherein said controller is further configured to establish a network connection with said second device upon detecting said network connection request from said second device and to cause data to be exchanged with said second device using said network connection.

18. The device of claim 17 wherein said controller is further configured to transmit an acknowledgement message responsive to said network connection request from said second device;
    said controller is configured to wait for a reply from said second device to said acknowledgement message; and
    said controller is configured to terminate said network connection if said reply is not received within a predetermined amount of time.

19. The device of claim 17 wherein said controller is further configured to suspend said sleep mode for a duration of said network connection.

20. The device of claim 14 wherein said controller is further configured to detect an acknowledgment message from said second device responsive to said network connection request sent by the device, and to cause a network connection to be established with said second device.

21. The device of claim 20, wherein said controller is further configured to send a reply to said acknowledgement request enabling a network connection with said second device to be established.

22. The device of claim 14 wherein a duration of said second subinterval is at least 90% of a duration of said beacon interval.

23. The device of claim 14, wherein said controller is further configured to define a monitoring period spanning an integral number of beacon intervals;

wherein, after each monitoring period, said controller changes a duration of said second portion from a first value to a second value, and wherein said second value is determined in relation to said second device to provide detection of a network connection request between the devices within a predetermined number of beacon intervals.

24. The device of claim 23, wherein said second value corresponds to a duration equal to approximately one-half of said beacon interval.

25. The device of claim 23, wherein said second value corresponds to a duration equal to one-half of said beacon interval and an additional period related to a time required to establish said wireless ad-hoc connection.

26. The device of claim 23, wherein network connection requests are not detected or sent during said sleep mode.

* * * * *